United States Patent
Nishino

(10) Patent No.: US 11,402,667 B2
(45) Date of Patent: Aug. 2, 2022

(54) OPTICAL SHEET AND OPTICAL COMPONENT

(71) Applicant: SUMITOMO BAKELITE CO., LTD., Shinagawa-ku (JP)

(72) Inventor: Satoshi Nishino, Shinagawa-ku (JP)

(73) Assignee: SUMITOMO BAKELITE CO., LTD., Shinagawa-ku (JP)

(*) Notice: Subject to any disclaimer, the term of this patent is extended or adjusted under 35 U.S.C. 154(b) by 0 days.

(21) Appl. No.: 17/428,385

(22) PCT Filed: Feb. 21, 2020

(86) PCT No.: PCT/JP2020/007152
§ 371 (c)(1),
(2) Date: Aug. 4, 2021

(87) PCT Pub. No.: WO2020/171219
PCT Pub. Date: Aug. 27, 2020

(65) Prior Publication Data
US 2022/0043283 A1    Feb. 10, 2022

(30) Foreign Application Priority Data
Feb. 22, 2019    (JP) ............... JP2019-030986

(51) Int. Cl.
G02C 7/12 (2006.01)
G02C 7/10 (2006.01)

(52) U.S. Cl.
CPC .................. *G02C 7/12* (2013.01); *G02C 7/10* (2013.01)

(58) Field of Classification Search
CPC ...... G02B 5/0816–0875; G02B 5/0891; G02B 5/281–289; G02B 5/3075; G02B 5/3025;
(Continued)

(56) References Cited

U.S. PATENT DOCUMENTS 8,770,749 B2    7/2014  McCabe et al.
9,575,335 B1*   2/2017  McCabe ............... G02C 7/104
(Continued)

FOREIGN PATENT DOCUMENTS

CN    106249484 A    12/2016
JP    2011-175260 A    9/2011
(Continued)

OTHER PUBLICATIONS

Durmuş, Haziret & Şafak, H. & Akbaş, Hatice Zehra & Ahmetli, Gulnare. (2011). Optical Properties of Modified Epoxy Resin with Various Oxime Derivatives in the UV-ViS Spectral Region. Journal of Applied Polymer Science. 120. 1490. 10.1002/app.33287. (Year: 2011).*

(Continued)

*Primary Examiner* — Travis S Fissel
(74) *Attorney, Agent, or Firm* — Oblon, McClelland, Maier & Neustadt, L.L.P.

(57) ABSTRACT

The optical sheet of the present invention is an optical sheet that includes a polarized layer having a polarization function and a light absorbing layer which is formed of a material including a resin and at least one type of light absorbing agent and absorbs light of a specific wavelength range in a visible light range, and is formed of a laminate in which the polarized layer and the light absorbing layer are laminated. The optical sheet has a first peak having an absorptance peak wavelength P1 in a wavelength range of 460 nm or more and 510 nm or less and a second peak having an absorptance peak wavelength P2 in a wavelength range of 430 nm or more and 680 nm or less in a light absorption spectrum. In addition, in a case where an average transmittance of visible light in the wavelength range of 475 nm or more and 650 nm or less is denoted by $T_{AVE}$ and a minimum transmittance of visible light in the wavelength range of 475 nm or more and (Continued)

650 nm or less is denoted by $T_{MIN}$, $T_{MIN}/T_{AVE}$ is 0.20 or more.

20 Claims, 6 Drawing Sheets

(58) Field of Classification Search
CPC .................. G02B 5/3041; G02B 17/0896; G02B 17/107; G02B 7/107; G02B 5/22; G02B 5/223
USPC .......... 359/361, 359, 353, 352, 885; 351/49, 351/159.63, 159.56
See application file for complete search history.

(56) References Cited

U.S. PATENT DOCUMENTS

| | | |
|---|---|---|
| 2011/0204767 A1 | 8/2011 | Jung et al. |
| 2011/0255051 A1 | 10/2011 | McCabe et al. |
| 2012/0019906 A1* | 1/2012 | Van Nuffel ............. B32B 27/20 359/359 |
| 2013/0141693 A1 | 6/2013 | McCabe et al. |
| 2013/0271725 A1 | 10/2013 | Chiou et al. |
| 2015/0355395 A1 | 12/2015 | Kimura et al. |
| 2017/0075143 A1 | 3/2017 | Saylor et al. |
| 2017/0139234 A1 | 5/2017 | Sharp |
| 2017/0299895 A1 | 10/2017 | Larson |
| 2017/0315384 A1 | 11/2017 | Saylor et al. |
| 2019/0250431 A1 | 8/2019 | Shan et al. |

FOREIGN PATENT DOCUMENTS

| | | |
|---|---|---|
| JP | 2013-11840 A | 1/2013 |
| JP | 2013-524300 A | 6/2013 |
| JP | 2014-156067 A | 8/2014 |
| JP | 2014-531058 A | 11/2014 |
| JP | 2018-534637 A | 11/2018 |
| KR | 10-2009-0090852 A | 8/2009 |
| KR | 10-2013-0020379 A | 2/2013 |
| WO | WO 2011/130314 A1 | 10/2011 |
| WO | WO 2013/070417 A1 | 5/2013 |
| WO | WO 2014/115705 A1 | 7/2014 |
| WO | WO 2017/070552 A1 | 4/2017 |
| WO | WO 2018/011613 A1 | 1/2018 |

OTHER PUBLICATIONS

International Search Report dated Apr. 7, 2020 in PCT/JP2020/007152 filed Feb. 21, 2020, citing documents AA-AF and AH-AT therein, 3 pages.

* cited by examiner

OPTICAL SHEET AND OPTICAL COMPONENT

CROSS-REFERENCE TO RELATED APPLICATIONS

This application is a national stage application of International Application No. PCT/JP2020/007152, filed Feb. 21, 2020, which is based upon and claims the benefit of priority to Japanese Patent Application No. 2019-030986, filed Feb. 22, 2019. The entire contents of these applications are incorporated herein by reference.

TECHNICAL FIELD

The present invention relates to an optical sheet and an optical component.

BACKGROUND ART

For example, there is known an optical sheet that has a polarization function for the purpose of enhancing the contrast of a visual field or preventing glare (for example, refer to PTL 1). This optical sheet is used by being attached to an eyeglass, a sunglass, a sun visor, and the like.

The optical sheet disclosed in PTL 1 is manufactured by stretching a layer including a resin material and a dye (light absorbing agent) contained in the resin material and absorbing light of a specific wavelength out of light in a visible light region, for example.

However, depending on the type and a blending ratio of the light absorbing agent, color discrimination properties are deteriorated. With regard to this point, sufficient examination has not been performed in the related art.

CITATION LIST

Patent Literature

[PTL 1] WO 2014/115705

SUMMARY OF INVENTION

Technical Problem

An object of the present invention is to provide an optical sheet and an optical component capable of emphasizing light of a specific wavelength range with respect to a user and enabling the user to perform color discrimination.

Solution to Problem

Such an object is achieved by the present invention of the following (1) to (7).

(1) An optical sheet including: a polarized layer having a polarization function, which includes a first light absorbing agent having a light absorptance peak in a wavelength range of 380 nm or more and 430 nm or less, a second light absorbing agent having a light absorptance peak in a wavelength range of 430 nm or more and 580 nm or less, and a third light absorbing agent having a light absorptance peak in a wavelength range of 580 nm or more and 680 nm or less; and a light absorbing layer which is formed of a material including a resin and at least one type of light absorbing agent and absorbs light of a specific wavelength range in a visible light range, in which the optical sheet is formed of a laminate in which the polarized layer and the light absorbing layer are laminated, in which the optical sheet has a first peak having an absorptance peak wavelength P1 in a wavelength range of 460 nm or more and 510 nm or less and a second peak having an absorptance peak wavelength P2 in a wavelength range of 650 nm or more and 700 nm or less in a light absorption spectrum, and in which in a case where an average transmittance of visible light in a wavelength range of 475 nm or more and 650 nm or less is denoted by $T_{AVE}$ and a minimum transmittance of visible light in the wavelength range of 475 nm or more and 650 nm or less is denoted by $T_{MIN}$, $T_{MIN}/T_{AVE}$ is 0.20 or more.

(2) The optical sheet according to (1), in which a light transmittance T1 at the peak wavelength P1 is 2% or more and 17% or less, and in which a light transmittance T2 at the peak wavelength P2 is 5% or more and 20% or less.

(3) The optical sheet according to (1) or (2), in which a half width W1 [nm] of the first peak is 5 nm or more and 15 nm or less, and in which a half width W2 [nm] of the second peak is 5 nm or more and 15 nm or less.

(4) The optical sheet according to any one of (1) to (3), in which the $T_{MIN}$ is 2% or more and 17% or less.

(5) The optical sheet according to any one of (1) to (4), in which the $T_{AVE}$ is 10% or more and 25% or less.

(6) The optical sheet according to any one of (1) to (5), in which the first light absorbing agent, the second light absorbing agent, and the third light absorbing agent are azo-based dyes.

(7) An optical component including: a substrate; and the optical sheet according to any one of (1) to (6) which is laminated on the substrate.

Advantageous Effects of Invention

According to the present invention, it is possible to provide an optical sheet and an optical component emphasizing light of a specific wavelength range with respect to a user and enabling the user to perform color discrimination.

DESCRIPTION OF EMBODIMENTS

Hereinafter, an optical sheet and an optical component of the present invention will be described in detail based on preferable embodiments shown in the accompanying drawings.

First Embodiment

Figure 1:
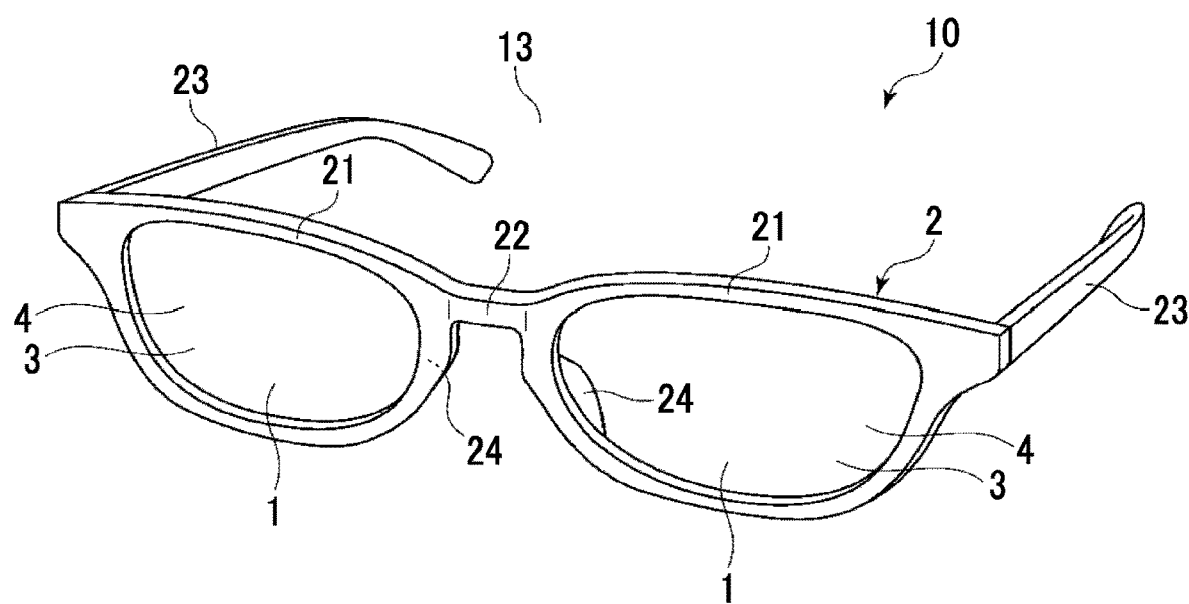
FIG. 1 is a perspective view of a sunglass including an optical sheet (first embodiment) of the present invention.
Figure 2:
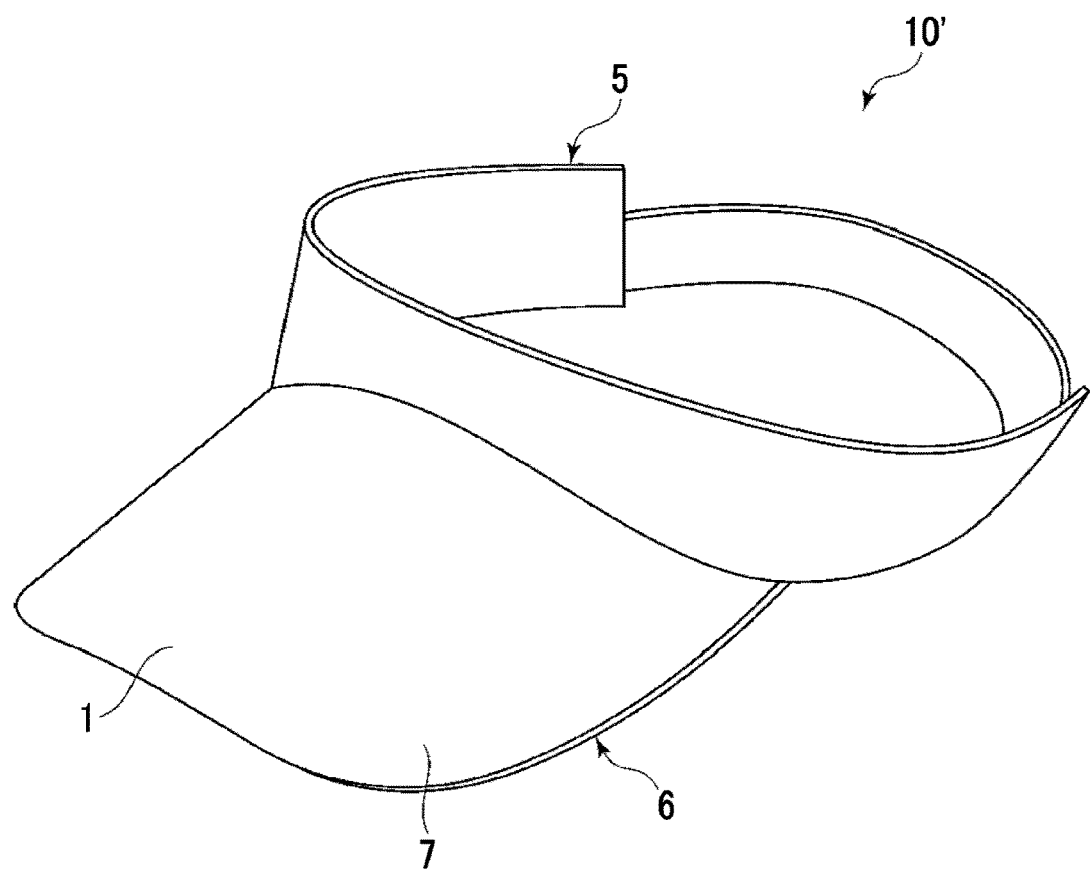
FIG. 2 is a perspective view of a sun visor including the optical sheet (first embodiment) of the present invention.
Figure 5:
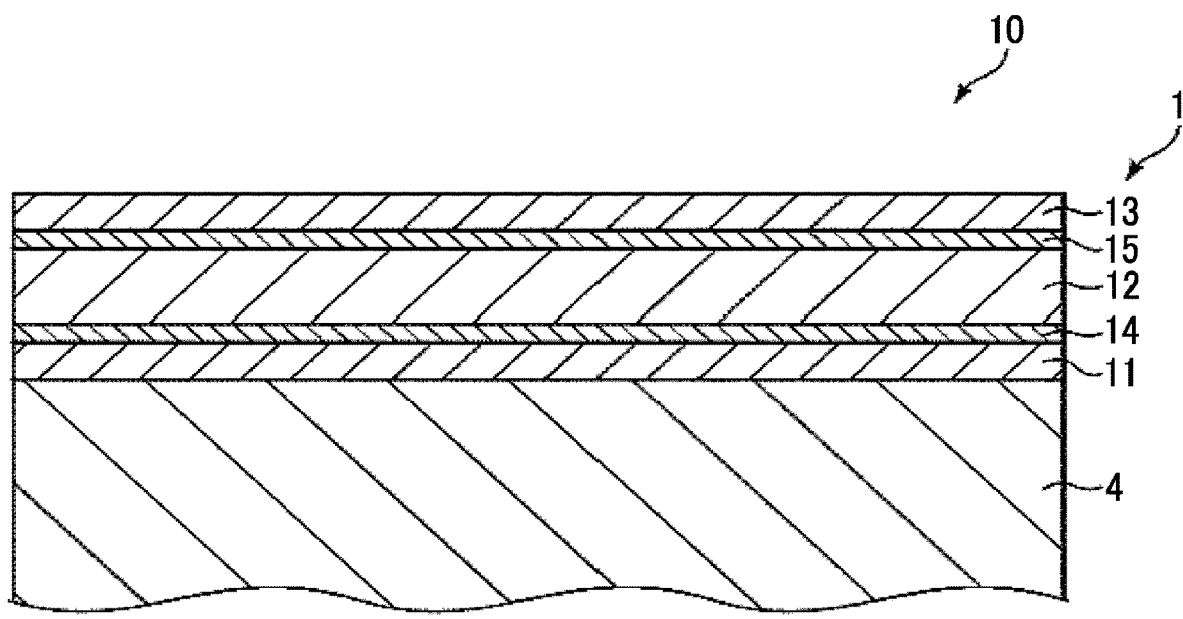
FIG. 5 is a sectional view of the optical component shown in FIG. 1.
Figure 6:
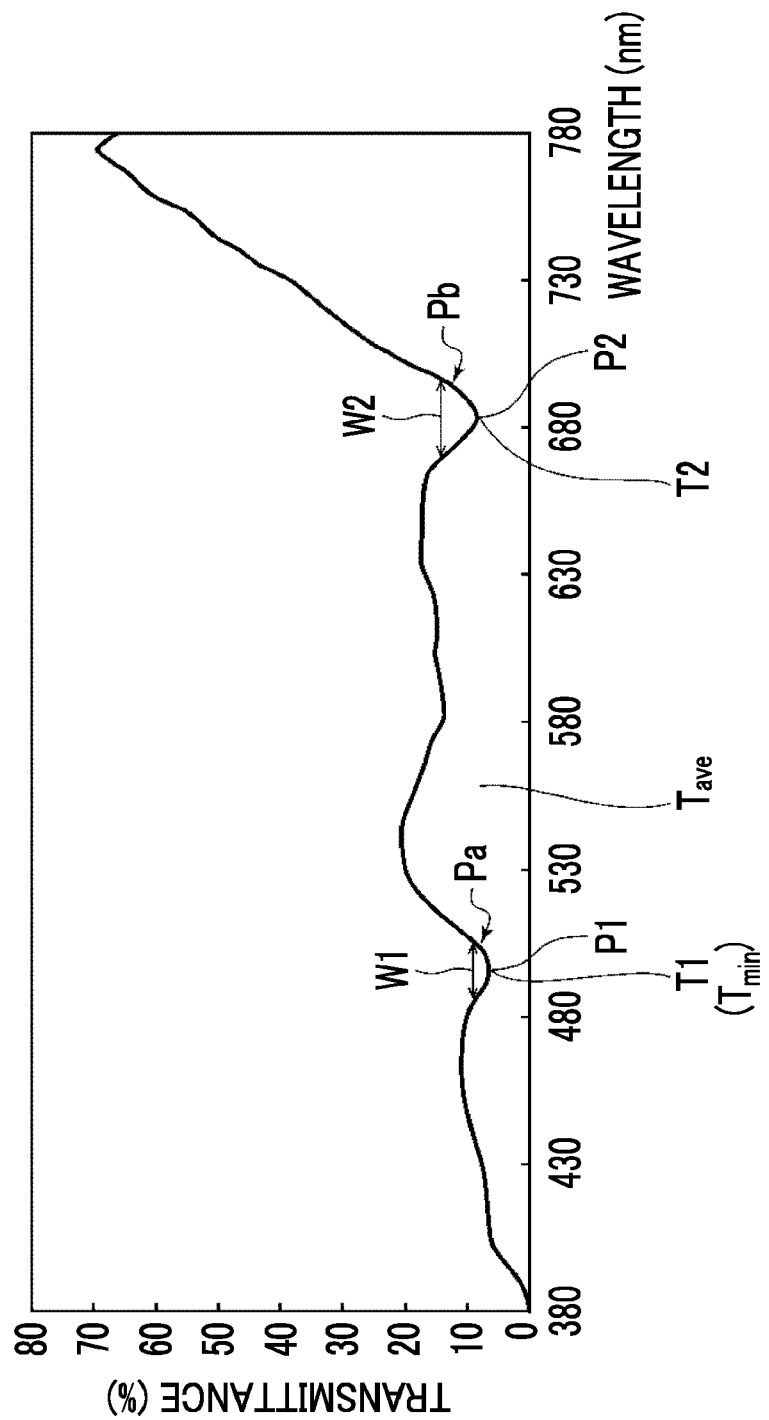
FIG. 6 is a graph showing a light absorption spectrum of the optical sheet shown in FIG. 5.
Figure 7:
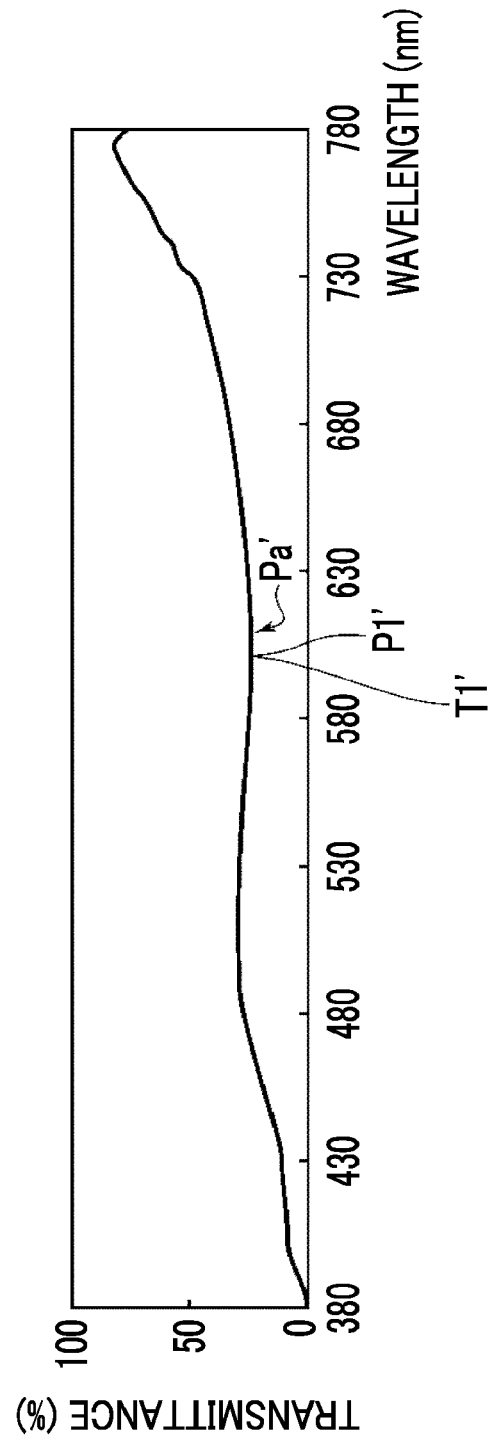
FIG. 7 is a graph showing a light absorption spectrum of a polarized layer included in the optical sheet shown in FIG. 5.
Figure 8:
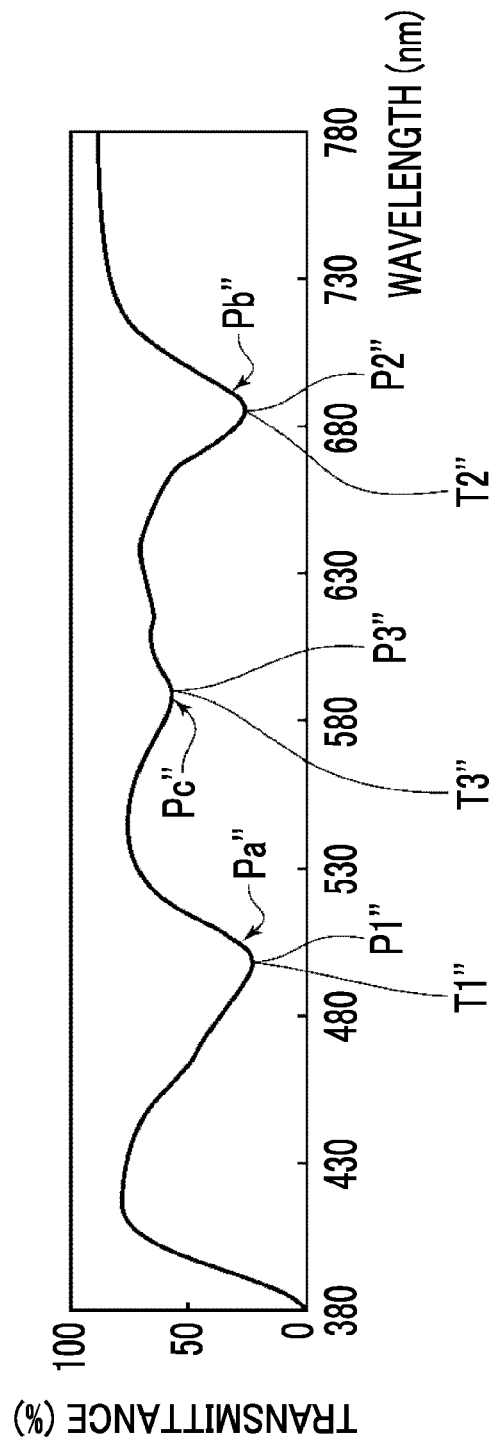
FIG. 8 is a graph showing a light absorption spectrum of a specific wavelength absorption layer included in the optical sheet shown in FIG. 5.

FIG. 1 is a perspective view of a sunglass including the optical sheet (first embodiment) of the present invention. FIG. 2 is a perspective view of a sun visor including the optical sheet (first embodiment) of the present invention. FIG. 5 is a sectional view of the optical component shown in FIG. 1. FIG. 6 is a graph showing a light absorption spectrum of the optical sheet shown in FIG. 5. FIG. 7 is a graph showing a light absorption spectrum of a polarized layer included in the optical sheet shown in FIG. 5. FIG. 8 is a graph showing a light absorption spectrum of a specific wavelength absorption layer included in the optical sheet shown in FIG. 5.

In FIGS. 1, 2, and 5, an upper side is referred to as "upper direction" or "upper", and a lower side is also referred to as "lower direction" or "lower". In addition, in the drawings referred to in the present specification, dimensions in a thickness direction are exaggeratedly illustrated, and are significantly different from actual dimensions.

The optical sheet 1 of the present invention shown in FIGS. 1, 2, and 5 includes a polarized layer 12 having a polarization function and a specific wavelength absorption layer 11 (light absorbing layer) that absorbs light of a specific wavelength range in a visible light range, and is formed of a laminate on which the polarized layer 12 and the specific wavelength absorption layer 11 are laminated. The polarized layer 12 includes a first light absorbing agent having a light absorptance peak in a wavelength range of 380 nm or more and 430 nm or less, a second light absorbing agent having a light absorptance peak in a wavelength range of 430 nm or more and 580 nm or less, and a third light absorbing agent having a light absorptance peak in a wavelength range of 580 nm or more and 680 nm or less. In addition, the specific wavelength absorption layer 11 (light absorbing layer) is formed of a material containing a resin and at least one type of light absorbing agent.

In addition, the optical sheet 1 has a first peak Pa having an absorptance peak wavelength P1 in a wavelength range of 460 nm or more and 510 nm or less and a second peak Pb having an absorptance peak wavelength P2 in a wavelength range of 650 nm or more and 700 nm or less in the light absorption spectrum. In addition, in the optical sheet 1, in a case where an average transmittance of visible light in the wavelength range of 475 nm or more and 650 nm or less is denoted by $T_{AVE}$ and a minimum transmittance of visible light in the wavelength range of 475 nm or more and 650 nm or less is denoted by $T_{MIN}$, $T_{MIN}/T_{AVE}$ is 0.20 or more.

Since the light absorption spectrum has the first peak Pa and the second peak Pb, it is possible to emphasize light in the specific wavelength range (in particular, 520 nm or more and 640 nm or less) with respect to the user. In particular, since the first peak Pa contributes to the absorption of blue-green light and the second peak Pb contributes to the absorption of orange light, red/green light can be emphasized with respect to the user and excellent discrimination properties are exhibited.

In addition, in a case where an average transmittance of visible light in the wavelength range of 475 nm or more and 650 nm or less is denoted by $T_{AVE}$ and a minimum transmittance of visible light in the wavelength range of 475 nm or more and 650 nm or less is denoted by $T_{MIN}$, $T_{MIN}/T_{AVE}$ is 0.20 or more. For this reason, an unnecessarily excessive emphasizing effect is not imparted to a user, and thus eyestrain is not caused, and mounting for a long time is possible while enhancing discrimination properties.

In a case where $T_{MIN}/T_{AVE}$ is less than 0.20, the minimum transmittance $T_{MIN}$ is too small and the emphasizing effect is strong, and there is a tendency that the wearer easily gets tired. In addition, in a case where the average transmittance $T_{AVE}$ is too large, the contrast is deteriorated, and in particular, the discrimination properties of blue color/green color are deteriorated and the visual field becomes unnatural.

In a case where one of the first peak and the second peak is omitted, the red/green light cannot be reliably emphasized.

Such an optical sheet 1 is used for a sunglass (optical component 10) shown in FIG. 1 or a sun visor (optical component 10') shown in FIG. 2.

As shown in FIG. 1, the sunglass (optical component 10) includes a frame 2 mounted on a user's head, and a lens 3 with an optical sheet (optical component) fixed to the frame 2. In the present specification, the term "lens" includes both of a lens having a light collecting function and a lens not having a light collecting function.

As shown in FIG. 1, the frame 2 is a member mounted on the user's head, and includes a rim portion 21, a bridge portion 22, a temple portion 23 that can be hung on the user's ear, and a nose pad portion 24. Each rim portion 21 has a ring shape, and is a portion where the lens 3 with an optical sheet is mounted inside.

The bridge portion 22 is a portion that connects each rim portion 21. The temple portion 23 has a vine shape and is connected to an edge of each rim portion 21. The temple portion 23 is a portion that can be hung on the user's ear. The nose pad portion 24 is a portion that comes into contact with the user' s nose in a mounting state in which the sunglass (optical component 10) is mounted on the user's head. With this, it is possible to reliably maintain the mounting state.

As long as the frame 2 is a member capable of being mounted in the user's head, a shape of the frame 2 is not limited to the shown figure.

The optical component of the present invention includes a lens 4 (substrate) and an optical sheet 1 laminated on a surface of the lens 4 on a front side (side opposite to human eyes in a mounting state). With this, it is possible to exhibit a function as a sunglass while enjoying advantages of the optical sheet 1 described above.

As shown in FIG. 2, the sun visor (optical component 10') includes a ring-shaped mounting portion 5 mounted on a user's head and a collar 6 provided in front of the mounting portion 5. The collar 6 includes a light transmitting member 7 (substrate) and the optical sheet 1 provided on an upper surface of the light transmitting member 7. With this, it is possible to exhibit a function as a sun visor while enjoying advantages of the optical sheet 1 described above.

Constituent materials of the lens 4 and the light transmitting member 7 are not particularly limited as long as the material has light transmitting properties, and examples thereof include various resin materials or various glasses but the material is preferably the same polycarbonate as the polycarbonate of the optical sheet 1. With this, it is possible to enhance adhesion between the lens 4 or the light transmitting member 7 and the optical sheet 1.

Hereinafter, the optical sheet 1 will be described in detail. In the following, a case of being laminated on the lens 4 (substrate) will be representatively described.

As shown in FIG. 5, the optical sheet 1 includes a specific wavelength absorption layer 11, a polarized layer 12, a protective layer 13, an adhesive layer 14, and an adhesive layer 15. In the optical sheet 1, the specific wavelength absorption layer 11, the adhesive layer 14, the polarized layer 12, the adhesive layer 15, and the protective layer 13 are laminated in this order. In addition, the optical sheet 1 is bonded to the lens 4 in a direction in which the specific wavelength absorption layer 11 is positioned on the lens 4 side.

(Specific Wavelength Absorption Layer)

The specific wavelength absorption layer 11 contains a light absorbing agent and an ultraviolet absorbing agent, using the polycarbonate as a main material.

The resin as the main material is not particularly limited, and examples thereof include polycarbonate, polyamide, polyvinyl chloride, polyethylene, polypropylene, and the like, and among these, the polycarbonate is preferable.

The polycarbonate is not particularly limited, and various materials can be used. Among these, aromatic polycarbonate is preferable. The aromatic polycarbonate includes an aromatic ring in the main chain, and with this, the strength of the optical sheet 1 can be further excellent.

The aromatic polycarbonate is synthesized by an interfacial polycondensation reaction between bisphenol and phosgene, an ester exchange reaction between bisphenol and diphenyl carbonate, and the like, for example.

Examples of the bisphenol include bisphenol A, bisphenol (modified bisphenol) which is a source of a repeating unit of the polycarbonate represented by the following formula (1), or the like, for example.

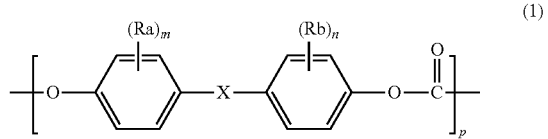

(1)

(In the formula (1), X is an alkyl group having 1 to 18 carbon atoms, an aromatic group, or a cycloaliphatic group, Ra and Rb each independently are an alkyl group having 1 to 12 carbon atoms, m and n each independently are an integer of 0 to 4, and p is the number of repeating units.)

Specific examples of the bisphenol that is a source of the repeating unit of the polycarbonate represented by the formula (1) include 4,4'-(pentane-2,2-diyl)diphenol, 4,4'-(pentane-3,3-diyl)diphenol, 4,4'-(butane-2,2-diyl)diphenol, 1,1'-(cyclohexanediyl)diphenol, 2-cyclohexyl-1,4-bis(4-hydroxyphenyl)benzene, 2,3-biscyclohexyl-1,4-bis(4-hydroxyphenyl)benzene, 1,1'-bis (4-hydroxy-3-methylphenyl) cyclohexane, 2,2'-bis (4-hydroxy-3-methylphenyl)propane, and the like, and one or two or more of these can be used in combination.

In particular, as the polycarbonate, bisphenol-type polycarbonate having a skeleton derived from bisphenol is preferable as a main component. By using the bisphenol-type polycarbonate, the optical sheet 1 exhibits further excellent strength.

An average molecular weight of the polycarbonate is preferably 20,000 or more and 30,000 or less, more preferably 23,000 or more and 28,000 or less, and further more preferably 24,000 or more and 27,500 or less.

With this, it is possible to sufficiently enhance the strength of the optical sheet 1. In addition, in a molten state of the polycarbonate, it is possible to sufficiently enhance the fluidity. Accordingly, in a case where the optical sheet 1 is manufactured by extrusion molding, for example, it is possible to perform extrusion molding in a state where the polycarbonate in the molten state and the light absorbing agent are sufficiently mixed with each other. Therefore, it is possible to prevent a state where the light absorbing agent is excessively aggregated after molding. In addition, since a viscosity average molecular weight My of the polycarbonate is 20,000 or more and 30,000 or less, the optical sheet has sufficient strength. As described above, the optical sheet 1 of the present invention prevents aggregation of the light absorbing agent and has sufficient strength.

In addition, the polycarbonate preferably has a melt flow rate (MFR) measured in accordance with JIS K7210 of 3 g/10 min or more and 30 g/10 min or less, and more preferably 15 g/10 min or more and 25 g/10 min or less. With this, it is possible to sufficiently enhance the fluidity of the polycarbonate in a molten state. Therefore, for example, in a case of manufacturing the optical sheet 1 by extrusion molding, it is possible to perform extrusion molding in a state where the polycarbonate in a molten state and the light absorbing agent are sufficiently mixed with each other.

In addition, the polycarbonate preferably has a water absorption rate of 0.02% or more and 0.2% or less, and more preferably has a water absorption rate of 0.04% or more and 0.15% or less. With this, it is possible to perform extrusion molding in a state where the polycarbonate in a molten state and the light absorbing agent are sufficiently mixed with each other. Therefore, it is possible to prevent the light absorbing agent from being excessively aggregated.

In addition, the water absorption rate in the present specification is a value measured by Aquatrac 3E (manufactured by Brabender Corporation).

In addition, a content of the polycarbonate in the specific wavelength absorption layer 11 is preferably 87 wt % or more and 99.949 wt % or less, and more preferably 90 wt % or more and 99.87 wt % or less. With this, it is possible to reliably exhibit the effect of the present invention.

<Light Absorbing Agent>

The light absorbing agent absorbs light of a specific wavelength. In the present specification, in a case where a value of a maximum absorption wavelength in a visible light region of 420 nm to 780 nm is set as λ1, a value on a side having a wavelength 20 nm lower than λ1 is set as λ2, and a value on a side having a wavelength 20 nm higher than λ1 is set as λ3, the expression "absorb light" means that the absorbance λ1/λ2 or the absorbance λ1/λ3 is 1.0 or more.

The light absorbing agent is not particularly limited as long as the light absorbing agent is a material that absorbs light of a specific wavelength out of light in a wavelength range of 350 nm or more and 780 nm or less, and examples thereof include a quinoline-based coloring agent, an anthraquinone-based coloring agent, a perylene-based coloring agent, a polymethine coloring agent, a porphyrin complex coloring agent, a phthalocyanine coloring agent, and the like. Among these, one or two or more can be used in combination.

Examples of the quinoline-based coloring agent include alkyl-substituted quinoline compounds such as 2-methylquinoline, 3-methylquinoline, 4-methylquinoline, 6-methylquinoline, 7-methylquinoline, 8-methylquinoline, 6-isopropylquinoline, 2,4-dimethylquinoline, 2,6-dimethylquinoline, and 4,6,8-trimethylquinoline; amine group-substituted quinoline compounds such as 2-aminoquinoline, 3-aminoquinoline, 4-aminoquinoline, 5-aminoquinoline, 6-aminoquinoline, 8-aminoquinoline, and 6-amino-2-methylquinoline; alkoxy group-substituted quinoline compounds such as 6-methoxy-2- methylquinoline, and 6,8-dimethoxy-4-methylquinoline; and halogen group-substituted quinoline compounds such as 6-chloroquinoline, 4,7-dichloroquinoline, 3-bromoquinoline, and 7-chloro-2-methylquinoline.

By blending such quinoline-based coloring agents, it is possible to absorb light in a wavelength range of 350 nm or more and 550 nm or less out of light incident on the specific wavelength absorption layer 11. It is preferable to have an absorption peak in a wavelength range of 400 nm or more and 550 nm or less.

Examples of the anthraquinone-based coloring agent include (1) 2-anilino-1,3,4-trifluoroanthraquinone, (2) 2-(o-ethoxycarbonylanilino)-1,3,4-trifluoroanthraquinone, (3) 2-(p-ethoxycarbonylanilino)-1,3,4-trifluoroanthraquinone, (4) 2-(m-ethoxycarbonylanilino)-1,3,4-trifluoroanthraquinone, (5) 2-(o-cyanoanilino)-1,3,4-trifluoroanthraquinone, (6) 2-(p-cyanoanilino)-1,3,4-trifluoroanthraquinone, (7) 2-(m-cyanoanilino)-1,3,4-trifluoroanthraquinone, (8) 2-(o-nitroanilino)-1,3,4-trifluoroanthraquinone, (9) 2-(p-nitroanilino)-1,3,4-trifluoroanthraquinone, (10) 2-(m-nitroanilino)-1,3,4-trifluoroanthraquinone, (11) 2-(p-tert-butylanilino)-1,3,4-trifluoroanthraquinone, (12) 2-(o-methoxyanilino)-1,3,4-trifluoroanthraquinone, (13) 2-(2,6-diisopropylanilino)-1,3,4-trifluoroanthraquinone, (14) 2-(2,6-dichloroanilino)-1,3,4-trifluoroanthraquinone, (15) 2-(2,6-difluoroanilino)-1,3,4-trifluoroanthraquinone, (16) 2-(3,4-dicyanoanilino)-1,3,4-trifluoroanthraquinone, (17) 2-(2,4,6-tri(loloanilino)-1,3,4-trifluoroanthraquinone, (18) 2-(2,3,5,6-tetrachloroanilino)-1,3,4-trifluoroanthraquinone, (19) 2-(2,3,5,6-tetrafluoroanilino)-1,3,4-trifluoroanthraquinone, (20) 3-(2,3,4,5-tetrafluoroanilino)-2-butoxy-1,4-difluoroanthraquinone, (21) 3-(4-cyano-3-chloroanilino)-2-octyloxy-1,4-difluoroanthraquinone, (22) 3-(3,4-dicyanoanilino)-2-hexyloxy-1,4-difluoroanthraquinone, (23) 3-(4-cyano-3-chloroanilino)-1,2-dibutoxy-4-fluoroanthraquinone, (24) 3-(p-cianoanilino)-2-phenoxy-1,4-difluoroanthraquinone, (25) 3-(p-cyanoanilino)-2-(2,6-diethylphenoxy)-1,4-difluoroanthraquinone, (26) 3-(2,6-dichloroanilino)-2-(2,6-dichlorophenoxy)-1,4-difluoroanthraquinone, (27) 3-(2,3,5,6-tetrachloroanilino)-2-(2,6-dimethoxyphenoxy)-1,4-difluoroanthraquinone, (28) 2,3-dianilino-1,4-difluoroanthraquinone, (29) 2,3-bis(p-tert-butylanilino)-1,4-difluoroanthraquinone, (30) 2,3-bis(p-methoxyanilino)-1,4-difluoroanthraquinone, (31) 2,3-bis(2-meth(xy-6-methylanilino)-1,4-difluoroanthraquinone, (32) 2,3-bis(2,6-diisopropylanilino)-1,4-difluoroanthraquinone, (33) 2,3-bis(2,4,6-trichloroanilino)-1,4-difluoroanthraquinone, (34) 2,3-bis(2,3,5,6-tetrachloroanilino)-1,4-difluoroanthraquinone, (35) 2,3-bis(2,3,5,6-tetrafluoroanilino)-1,4-difluoroanthraquinone, (36) 2,3-bis(p-cyanoanilino)-1-methoxyethoxy-4-fluoroanthraquinone, (37) 2-(2,6-dichloroanilino)-1,3,4-trichloroanthraquinone, (38) 2-(2,3,5,6-tetrafluoroanilino)-1,3,4-trichloroanthraquinone, (39) 3-(2,6-dichloroanilino)-2-(2,6-dichlorophenoxy)-1,4-dichloroanthraquinone, (40) 2-(2,6-dichloroanilino) anthraquinone, (41) 2-(2,3,5,6-tetrafluoroanilino)anthraquinone, (42) 3-(2,6-dichloroanilino)-2-(2,6-dichlorophenoxy) anthraquinone, (43) 2,3-bis(2-methoxy-6-methylanilino)-1,4-dichloroanthraquinone, (44) 2,3-bis(2,6-diisopropylanilino) anthraquinone, (45) 2-butylamino-1,3,4-trifluoroanthraquinone, (46) 1,4-bis(n-butylamino)-2,3-difluoroanthraquinone (47) 1,4-bis (n-octylamino)-2,3-difluoroanthraquinone, (48) 1,4-bis (hydroxyethylamino)-2,3-difluoroanthraquinone, (49) 1,4-bis (cyclohexylamino)-2,3-difluoroanthraquinone, (50) 1,4-bis (cyclohexylamino)-2-octyloxy-3-fluoroanthraquinone, (51) 1,2,4-tris(2,4-dimethoxyphenoxy)-3-fluoroanthraquinone, (52) 2,3-bis(phenylthio)-1-phenoxy-4-fluoroanthraquinone, (53) 1,2,3,4-tetra(p-methoxyphenoxy)anthraquinone, and the like.

By blending such anthraquinone-based coloring agents, it is possible to absorb light in a wavelength range of 450 nm or more and 600 nm or less out of light incident on the specific wavelength absorption layer 11. It is preferable to have an absorption peak in a wavelength range of 500 nm or more and 600 nm or less.

Examples of the perylene-based coloring agent include N,N'-bis(3,5-dimethylphenyl)-perylene-3,4,9,10-tetracarboxylic diimide, N,N'-dimethylperylene-3,4,9,10-tetracarboxylic diimide, N,N'-diethylperylene-3,4,9,10-tetracarboxylic diimide, N,N'-bis (4-methoxyphenyl)-perylene-3,4,9,10-tetracarboxylic diimide, N,N'-bis(4-ethoxyphenyl)-perylene-3,4,9,10-tetracarboxylic diimide, N,N'-bis(4-chlorophenyl)-perylene-3,4,9,10-tetracarboxylic diimide, and the like, and particularly preferable examples thereof include N,N'-bis(3,5-dimethylphenyl)-perylene-3,4,9,10-tetracarboxylic diimide, and the like.

By blending such perylene-based coloring agents, it is possible to absorb light in a wavelength range of 400 nm or more and 800 nm or less out of the light incident on the specific wavelength absorption layer 11. It is preferable to have an absorption peak in a wavelength range of 600 nm or more and 780 nm or less.

Examples of the polymethine coloring agents include streptocyanine or open chain cyanine, hemicyanine, closed cyanine, and merocyanine.

By blending such polymethine coloring agents, it is possible to absorb light in a wavelength range of 400 nm or more and 700 nm or less out of the light incident on the specific wavelength absorption layer 11. It is preferable to have an absorption peak in a wavelength range of 450 nm or more and 550 nm or less.

Examples of the porphyrin complex coloring agents include tetraazaporphyrin metal complex, tetraarylporphyrin, octaethylporphyrin, and the like.

By blending such porphyrin complex coloring agents, it is possible to absorb light in a wavelength range of 500 nm or more and 700 nm or less out of the light incident on the specific wavelength absorption layer 11. It is preferable to have an absorption peak in a wavelength range of 550 nm or more and 600 nm or less.

Examples of the phthalocyanine coloring agents include CoPc-4-sulfonic acid sodium salt, cobalt Pc tetracarboxylic acid, octahydroxy NiPc, and the like.

By blending such phthalocyanine coloring agents, it is possible to absorb light in a wavelength range of 550 nm or more and 750 nm or less out of the light incident on the specific wavelength absorption layer 11. It is preferable to have an absorption peak in a wavelength range of 550 nm or more and 600 nm or less.

By blending the light absorbing agent as described above, it is possible to absorb light in a specific wavelength range. Therefore, for example, the user can clearly recognize the outline of an object or a person in a mounting state, and can enhance safety.

A content of the light absorbing agent (total of each light absorbing agent) in the specific wavelength absorption layer 11 is preferably 0.001 wt % or more and 5 wt % or less, and more preferably 0.003 wt % or more and 4 wt % or less. With this, it is possible to reliably exhibit the above effect. In a case where the content is too small, there is a concern that the effect as a light absorbing agent may not be sufficiently obtained. On the other hand, in a case where the content is too large, the light absorbing agent tends to be easily aggregated.

In addition, a basis weight of the light absorbing agent (total of each light absorbing agent) in the specific wavelength absorption layer 11 is preferably 0.05 mg/m$^2$ or more and 500 mg/m$^2$ or less, and more preferably 1 mg/m$^2$ or more and 100 mg/m$^2$ or less. With this, it is possible to reliably exhibit the effect of the present invention.

<Ultraviolet Absorbing Agent>

The ultraviolet absorbing agent absorbs ultraviolet rays (light in a wavelength range of 100 nm or more and 420 nm or less). With this, it is possible to mitigate the irradiation of the user's eyes with ultraviolet rays, and to protect the user's eyes. In addition, it is possible to prevent the light absorbing agent from being deteriorated by ultraviolet rays. That is, the ultraviolet absorbing agent functions as a deterioration preventing agent that prevents deterioration of the light absorbing agent.

The ultraviolet absorbing agent is not particularly limited, but examples thereof include a triazine-based compound, a benzophenone-based compound, a benzotriazole-based compound, and a cyanoacrylate-based compound, and one or two or more of these can be used in combination. Among these, the triazine-based compound is particularly preferably used. With this, it is possible to prevent or suppress deterioration of the specific wavelength absorption layer 11 (polycarbonate and light absorbing agent) due to ultraviolet rays and to enhance weather resistance of the optical sheet 1.

Examples of the triazine-based compound include 2-mono (hydroxyphenyl)-1,3,5-triazine compound, 2,4-bis (hydroxyphenyl)-1,3,5-triazine compound, and 2,4,6-tris (hydroxyphenyl)-1,3,5-triazine compound, and specific examples thereof include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3-5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, 2,4,6-tris(2-hydroxy-3-methyl-4-(1-(2-ethoxyhexyloxy)-1-oxopropan-2-yloxy)phenyl)-1,3,5-triazine, and the like. In addition, examples of commercially available products of triazine-based ultraviolet absorbing agents include "Tinuvin 1577", "Tinuvin 460", "Tinuvin 477" (manufactured by BASF Japan), "ADEKA STAB LA-F70" (manufactured by ADEKA), and the like.

The specific wavelength absorption layer 11 further includes an ultraviolet absorbing agent that absorbs light in the wavelength range of 100 nm or more and 420 nm or less as described above, and thus it is possible to absorb light in a wavelength range of 100 nm or more and 420 nm or less out of light incident on the specific wavelength absorption layer 11. With this, it is possible to prevent or suppress deterioration of the specific wavelength absorption layer 11 (polycarbonate and light absorbing agent) due to ultraviolet rays and to enhance weather resistance of the optical sheet 1.

A content of the ultraviolet absorbing agent in the specific wavelength absorption layer 11 is preferably 0.05 wt % or more and 8 wt % or less, and more preferably 0.07 wt % or more and 6 wt % or less. With this, it is possible to reliably exhibit the above effect. In a case where the content is too small, the effect as an ultraviolet absorbing agent may not be sufficiently obtained. On the other hand, in a case where the content is too large, the ultraviolet absorbing agent tends to be easily aggregated.

In addition, the basis weight of the ultraviolet absorbing agent in the specific wavelength absorption layer 11 is preferably 0.01 g/m$^2$ or more and 100 g/m$^2$ or less, and more preferably 0.1 g/m$^2$ or more and 10 g/m$^2$ or less. With this, it is possible to reliably exhibit the above effect.

A thickness of the specific wavelength absorption layer 11 is not particularly limited, but is preferably 0.05 mm or more and 1.5 mm or less, and more preferably 0.3 mm or more and 0.7 mm or less. With this, it is possible to enhance handleability and to prevent the optical component as a whole from being unnecessarily thick.

In addition, the specific wavelength absorption layer 11 may be manufactured by stretching or may be manufactured without stretching, but the stretching degree is preferably 10% or less, and more preferably 5% or less. With this, it is possible to prevent or suppress occurrence of color unevenness, unevenness of a light absorbing agent, and unevenness of an ultraviolet absorbing agent during stretching.

In a case where a melting point of the polycarbonate is set as t1 and a melting point of a light absorbing agent is set as t2, it is preferable that t1<t2 is satisfied. With this, in a case where the polycarbonate in a molten state and the light absorbing agent are mixed with each other, it is possible to prevent the light absorbing agent from being changed in quality or discolored by heat.

In a case where the melting point of the polycarbonate is set as t1 and the melting point of the ultraviolet absorbing agent is set as t3, it is preferable that t1<t3 is satisfied. With this, in a case where the polycarbonate in a molten state and the ultraviolet absorbing agent are mixed with each other, it is possible to prevent the ultraviolet absorbing agent from being changed in quality or discolored by heat.

The melting point t1 of the polycarbonate is preferably 250° C. or more and 400° C. or less, and more preferably 270° C. or more and 350° C. or less.

The melting point t2 of the light absorbing agent is preferably 300° C. or more and 400° C. or less, and more preferably 330° C. or more and 360° C. or less. In addition, the melting point t3 of the ultraviolet absorbing agent is preferably 310° C. or more and 370° C. or less, and more preferably 340° C. or more and 360° C. or less. By setting the melting points t1 to t3 within the above numerical value range, it is possible to reliably exhibit the above effect.

The light absorbing agent may be different coloring agents from the coloring agents exemplified above. The coloring agent is not particularly limited, and examples thereof include a pigment, a dye, and the like, and these can be used alone or used by being mixed together. In addition, it is possible to use the coloring agent by mixing thereof with materials described above.

The pigment is not particularly limited, and examples thereof include phthalocyanine-based pigments such as phthalocyanine green and phthalocyanine blue, azo-based pigments such as fast yellow, disazo yellow, condensed azo yellow, penzoimidazolone yellow, dinitroaniline orange, penzimidazolone orange, toluidine red, permanent carmine, permanent red, naphthol red, condensed azo red, benzimidazolone carmine, and benzimidazolone brown, anthraquinone-based pigments such as anthrapyrimidine yellow and anthraquinonyl red, azomethine-based pigments such as copper azomethine yellow, quinophthalone-based pigments such as quinophthalone yellow, isoindoline-based pigments such as isoindoline yellow, nitroso-based pigments such as nickel dioxime yellow, perinone-based pigments such as perinone orange, quinacridone-based pigments such as quinacridone magenta, quinacridone maroon, quinacridone scarlet, and quinacridone red, perylene-based pigments such as perylene red and perylene maroon, pyrrolopyrrole-based pigments such as diketopyrrolopyrrole red, organic pigments such as dioxazine-based pigments such as dioxazine violet, carbon-based pigments such as carbon black, lamp black, furnace black, ivory black, graphite, and fullerene, chromate-based pigments such as chrome yellow and molybdate orange, sulfide-based pigments such as cadmium yellow, cadmium lithopone yellow, cadmium orange, cadmium lithopone orange, silver vermilion, cadmium red, cadmium lithopone red, and sulfidation, oxide-based pigments such as ocher, titanium yellow, titanium barium nickel yellow, red iron, lead red, amber, brown iron oxide, zinc iron chrome brown, chromium oxide, cobalt green, cobalt chrome green, titanium cobalt green, cobalt blue, cerulean blue, cobalt aluminum chrome blue, iron black, manganese ferrite black, cobalt ferrite black, copper chromium black, and copper chromium manganese black, hydroxide-based pigments such as viridian, ferrocyanide-based pigments such as Prussian blue, silicate-based pigments such as ultramarine blue, phosphate-based pigments such as cobalt violet and mineral violet, and inorganic pigments such as others (for example, cadmium sulfide, cadmium selenide, and the like), and the like, and one or two or more of these can be used in combination.

The dye is not particularly limited, and examples thereof include metal complex coloring agent, cyan-based coloring agent, xanthene-based coloring agent, merocyanine-based coloring agent, phthalocyanine-based coloring agent, azo-based coloring agent, hibiscus coloring agent, blackberry coloring agent, raspberry coloring agent, pomegranate juice coloring agent, chlorophyll coloring agent, porphyrin-based compounds such as tetraazoporphyrin compound, and the like, and one or two or more of these can be used in combination.

(Polarized Layer)

The polarized layer 12 has a function of extracting linearly polarized light having a polarization plane in a predetermined direction from incident light (natural light that is not polarized). With this, in the incident light incident on the eye via the optical sheet 1, disturbance light is removed and polarization is performed.

A polarization degree of the polarized layer 12 is not particularly limited, but is preferably 50% or more and 100% or less, and more preferably 80% or more and 100% or less, for example.

The polarized layer 12 is a layer in which the first light absorbing agent, the second light absorbing agent, and the third light absorbing agent are adsorbed, dyed, and uniaxially stretched on a polymer film made of polyvinyl alcohol (PVA), partially formalized polyvinyl alcohol, polyethylene vinyl alcohol, polyvinyl butyral, polycarbonate, ethylene-vinyl acetate copolymer partially saponified product, or the like. In particular, polyvinyl alcohol (PVA) is a material that is excellent in transparency, heat resistance, affinity with the first light absorbing agent to the third light absorbing agent, and orientation during stretching. Therefore, the polarized layer 12 mainly formed of PVA is excellent in heat resistance and excellent in a polarization function.

The first light absorbing agent has a light absorptance peak (yellow color absorption) in a wavelength range of 380 nm or more and 430 nm or less. Specific examples thereof include direct dyes, acid dyes, and basic dyes, and one or more of these can be used in combination.

The second light absorbing agent has a light absorptance peak (red color absorption) in a wavelength range of 430 nm or more and 580 nm or less. Specific examples thereof include direct dyes, acid dyes, and basic dyes, and one or more of these can be used in combination.

The third light absorbing agent has a light absorptance peak (blue color absorption) in a wavelength range of 580 nm or more and 680 nm or less. Specific examples thereof include direct dyes, acid dyes, and basic dyes, and one or more of these can be used in combination.

Examples of direct dyes include azo-based dye, phthalocyanine-based dye, dioxazine-based dye, and the like. Examples of the acid dyes include azo-based dye, anthraquinone-based dye, triphenylmethane-based dye, phthalocyanine-based dye, oxygen anthracene-based dye, xanthene-based dye, indigoid-based dye, nitroso group-based dye, pyrazolone-based dye, and the like. Examples of the basic dye include azo-based dye, triphenylmethane-based dye, azine-based dye, thiazine-based dye, oxazine-based dye, and the like.

Among these, the first light absorbing agent, the second light absorbing agent, and the third light absorbing agent are preferably direct dyes, and specifically, are preferably azo-based direct dyes. With this, polyvinyl alcohol (PVA) can be efficiently dyed in water, and a desired color can be reliably dyed.

A content of the first light absorbing agent in the polarized layer 12 is preferably 0.0001 wt % or more and 0.1 wt % or less, and more preferably 0.001 wt % or more and 0.08 wt % or less.

A content of the second light absorbing agent in the polarized layer 12 is preferably 0.0001 wt % or more and 0.1 wt % or less, and more preferably 0.001 wt % or more and 0.08 wt % or less.

A content of the third light absorbing agent in the polarized layer 12 is preferably 0.0001 wt % or more and 0.1 wt % or less, and more preferably 0.001 wt % or more and 0.08 wt % or less.

By setting the contents of the first light absorbing agent to the third light absorbing agent in the numerical value range, it is possible to more reliably maintain the optical characteristics (high contrast performance) of the specific wavelength absorption layer 11 and to set the $T_{MIN}/T_{AVE}$ to be 0.20 or more as described later.

A thickness of the polarized layer 12 is not particularly limited, and is preferably 5 μm or more and 60 μm or less, and more preferably 10 μm or more and 40 μm or less, for example.

(Protective Layer)

The protective layer 13 is located on an outermost side in a state where the optical sheet 1 is bonded to the lens 4, and has a function of protecting a layer inside the protective layer 13. A thickness of the protective layer 13 is not particularly limited, and is preferably 10 μm or more and 100 μm or less, and more preferably 30 μm or more and 60 μm or less.

The constituent material of the protective layer 13 is not particularly limited as long as it has light transmitting properties, and examples thereof include various resin materials, various glass materials, and the like. The resin material is not particularly limited, and examples thereof include the same material as the resin material of the specific wavelength absorption layer 11 described above, but the same material as the resin material of the specific wavelength absorption layer 11 is preferable.

In addition, the protective layer 13 is preferably stretched in one direction, and the stretching degree is preferably 1% or more and 10% or less, and more preferably 2% or more and 8% or less. In addition, the stretching direction is preferably coincident with the stretching direction of the polarized layer 12. With this, the polarization characteristics of the optical sheet 1 as a whole can be improved.

(Adhesive Layer)

The adhesive layer 14 has a function of bonding the specific wavelength absorption layer 11 and the polarized layer 12. The adhesive layer 15 has a function of bonding the polarized layer 12 and the protective layer 13.

The adhesive (or pressure-sensitive adhesive) constituting the adhesive layer 14 and the adhesive layer 15 is not particularly limited, and examples thereof include an acrylic adhesive, a urethane adhesive, an epoxy adhesive, a silicone adhesive, and the like. Among these, the urethane-based adhesive is preferable. With this, the transparency, adhesive strength, and durability of the adhesive layer 13 are more excellent, and the conformability to shape change is particularly excellent.

In addition, the adhesives constituting the adhesive layer 14 and the adhesive layer 15 may be the same kind, or may be different.

A thickness of the adhesive layer 14 and the adhesive layer 15 is not particularly limited, and is preferably 5 μm or more and 60 μm or less, and more preferably 10 μm or more and 40 μm or less, for example. The thicknesses of the adhesive layer 14 and the adhesive layer 15 may be the same, or may be different.

The optical sheet 1 as described above preferably has a total thickness of 0.1 mm or more and 2 mm or less.

Since such an optical sheet 1 has the above-described configuration, the optical sheet 1 can absorb light in a specific wavelength range, a user can clearly recognize the outline and the color of an object or a person in a mounting state, and can enhance the safety. That is, the optical sheet 1 has high contrast and high color discrimination properties.

In addition, by adjusting the wavelength range of the light absorbed by the light absorbing agent contained in each layer, it is possible to emphasize light of a predetermined color with respect to the user. In the optical sheet 1, it is possible to appropriately set which color is emphasized with respect to the user, or which color visibility is particularly enhanced, depending on the selection of the type of the light absorbing agent of the specific wavelength absorption layer 11 and the first light absorbing agent to the third light absorbing agent of the polarized layer 12, the adjustment of the blending amount, and the like.

However, in the related art, what kind of optical characteristics the optical sheet 1 as a whole should have, that is, what kind of light absorption spectrum the optical sheet 1 should have, has not been sufficiently studied. Therefore, the present inventors have performed intensive study and configured the optical sheet 1 to have the following light absorption spectrum, found that the optical sheet 1 has high contrast and high color discrimination properties, and completed the present invention. This will be described below.

FIG. 6 is a graph showing a light absorption spectrum of the optical sheet 1 in which the horizontal axis represents wavelength (nm) and the vertical axis represents transmittance (%). In addition, the transmittance on the vertical axis has a correlation with the light absorptance, and the greater the light absorptance is, the smaller the light transmittance is, and the smaller the light absorptance is, the greater the light transmittance is. The light absorption spectrum shown in FIG. 6 is a light absorption spectrum obtained by synthesizing the light absorption spectrum of each layer.

The optical sheet 1 of the present invention has a first peak Pa having an absorptance peak wavelength P1 in a wavelength range of 460 nm or more and 510 nm or less and a second peak Pb having an absorptance peak wavelength P2 in a wavelength range of 650 nm or more and 700 nm or less in the light absorption spectrum shown in FIG. 6. In addition, in a case where an average transmittance of visible light in the wavelength range of 475 nm or more and 650 nm or less is denoted by $T_{AVE}$ and a minimum transmittance of visible light in the wavelength range of 475 nm or more and 650 nm or less is denoted by $T_{MIN}$, $T_{MIN}/T_{AVE}$ is 0.20 or more.

Since the light absorption spectrum has the first peak Pa and the second peak Pb, it is possible to emphasize light in the specific wavelength range (in particular, 520 nm or more and 640 nm or less) with respect to the user. In particular, since the first peak Pa contributes to the absorption of blue-green light and the second peak Pb contributes to the absorption of orange light, red/green light can be emphasized with respect to the user and excellent discrimination properties are exhibited.

In addition, in a case where an average transmittance of visible light in the wavelength range of 475 nm or more and 650 nm or less is denoted by $T_{AVE}$ and a minimum transmittance of visible light in the wavelength range of 475 nm or more and 650 nm or less is denoted by $T_{MIN}$, $T_{MIN}/T_{AVE}$ is 0.20 or more. Therefore, an unnecessarily excessive emphasizing effect is not imparted to a user, and thus eyestrain is not caused, and mounting for a long time is possible while enhancing discrimination properties.

In a case where $T_{MIN}/T_{AVE}$ is less than 0.20, the minimum transmittance $T_{MIN}$ is too small and the emphasizing effect is strong, and there is a tendency that the wearer easily gets tired. In addition, in a case where the average transmittance $T_{AVE}$ is too large, the contrast is deteriorated, and in particular, the discrimination properties of blue color/green color are deteriorated and the visual field becomes unnatural.

In a case where $T_{MIN}/T_{AVE}$ is 0.20 or more, the effect of the present invention can be sufficiently exhibited, but in a case where $T_{MIN}/T_{AVE}$ is 0.23 or more, and more preferably 0.29 or more, the effect of the present invention can be more remarkably obtained. In addition, $T_{MIN}/T_{AVE}$ is preferably 0.7 or less. In a case where $T_{MIN}/T_{AVE}$ exceeds 0.7, there is a tendency that the selection of the type of the light absorbing agent of the specific wavelength absorption layer 11 and the first light absorbing agent to the third light absorbing agent of the polarized layer 12, the adjustment of the blending amount, and the like become difficult.

In addition, in the present embodiment, the minimum transmittance of the peak wavelength P1 becomes the minimum transmittance $T_{MIN}$. The minimum transmittance $T_{MIN}$ is preferably 2% or more and 17% or less, and more preferably 4% or more and 15% or less. With this, in the present embodiment, blue-green light can be sufficiently absorbed, and this contributes to the improvement in green color discrimination properties. The minimum transmittance of the peak wavelength P2 may be the minimum transmittance $T_{MIN}$. In this case, orange light can be sufficiently absorbed, and this contributes to the improvement in red color discrimination properties. In addition, this contributes to satisfaction of the relationship of $T_{MIN}/T_{AVE} \geq 0.20$.

The average transmittance $T_{AVE}$ is preferably 7% or more and 25% or less, and more preferably 10% or more and 17% or less. With this, it is possible to easily perform selection of the type of the light absorbing agent of the specific wavelength absorption layer 11 and the first light absorbing agent to the third light absorbing agent of the polarized layer 12, the adjustment of the blending amount, and the like.

In addition, the light absorption spectrum of the optical sheet 1 shown in FIG. 6 is represented by a curve having the first peak Pa and the second peak Pb.

The light transmittance T1 of the first peak Pa at the peak wavelength P1 is preferably 2% or more and 17% or less, and more preferably 4% or more and 15% or less. With this, it is possible to suppress the average transmittance $T_{AVE}$ from becoming excessively large while increasing the minimum transmittance $T_{MIN}$. Therefore, it contributes to satisfaction of the relationship of $T_{MIN}/T_{AVE} \geq 0.20$.

The light transmittance T2 at the peak wavelength P2 of the second peak Pb is preferably 5% or more and 20% or less, more preferably 6% or more and 17% or less, and particularly preferably 7.5% or more and 15% or less. With this, it is possible to suppress the average transmittance $T_{AVE}$ from becoming excessively large while increasing the minimum transmittance $T_{MIN}$. Therefore, it contributes to satisfaction of the relationship of $T_{MIN}/T_{AVE} \geq 0.20$.

The half width W1 [nm] at the first peak Pa is preferably 5 nm or more and 15 nm or less, and more preferably 7 nm or more and 13 nm or less. With this, it is possible to absorb light in the wavelength range in the vicinity of the peak wavelength P1 without excess or deficiency. In addition, it contributes to the satisfaction of the relationship of $T_{MIN}/T_{AVE} \geq 0.20$.

A half width W2 [nm] of the second peak Pb is preferably 5 nm or more and 15 nm or less, and more preferably 7 nm or more and 13 nm or less. With this, it is possible to absorb light in the wavelength range in the vicinity of the peak wavelength P2 without excess or deficiency. In addition, it contributes to the satisfaction of the relationship of $T_{MIN}/T_{AVE} \geq 0.20$.

The half width W1 at the first peak Pa is defined as follows. First, the absorbance is measured toward the outside on both sides of the peak wavelength P1 at an interval of 2 nm from the peak wavelength P1, two initial wavelengths (10 nm or more apart from the center) at which a change in the absorbance is 0.005 or less are detected, and among these, a wavelength with the higher transmittance is a bottom wavelength. The width of the first peak Pa, when the difference between the transmittance of the bottom wavelength and the transmittance of the peak wavelength P1 is half, is the half width at the first peak Pa.

In addition, the half width W2 at the second peak Pb is defined as follows. First, the absorbance is measured toward the outside on both sides of the peak wavelength P2 at an interval of 2 nm from the peak wavelength P2, two initial wavelengths (10 nm or more apart from the center) at which a change in the absorbance is 0.005 or less are detected, and among these, a wavelength with the higher transmittance is a bottom wavelength. The width of the second peak Pb, when the difference between the transmittance of the bottom wavelength and the transmittance of the peak wavelength P2 is half, is defined as the half width at the second peak Pb.

By setting at least one of the light absorption spectrum of the polarized layer 12 shown in FIG. 7 and the light absorption spectrum of the specific wavelength absorption layer 11 shown in FIG. 8, in the light absorption spectrum as described above, the shape, that is, the absorption characteristics can be adjusted.

In addition, the light absorption spectrum of the polarized layer 12 shown in FIG. 7 has a first peak Pa' having a peak P1' in the wavelength range of 500 nm or more and 650 nm or less.

The light transmittance T1' at the peak wavelength P1' of the first peak Pa' is preferably 10% or more and 30% or less, and more preferably 15% or more and 25% or less. With this, it is possible to suppress the average transmittance $T_{AVE}$ from becoming excessively large while increasing the minimum transmittance $T_{MIN}$. Therefore, it contributes to satisfaction of the relationship of $T_{MIN}/T_{AVE} \leq 0.20$.

In addition, the light absorption spectrum of the specific wavelength absorption layer 11 shown in FIG. 8 has a first peak Pa" having a peak wavelength P1" in a wavelength range of 460 nm or more and 510 nm or less, a second peak Pb" having a peak wavelength P2" in a wavelength range of 650 nm or more and 700 nm or less, and a third peak Pc" having a peak wavelength P3" in a wavelength range of 560 nm or more and 610 nm or less.

The light transmittance T1" of the first peak Pa" at the peak wavelength P1" is preferably 15% or more and 35% or less, and more preferably 20% or more and 30% or less. With this, it is possible to suppress the average transmittance $T_{AVE}$ from becoming excessively large while increasing the minimum transmittance $T_{MIN}$. Therefore, it contributes to satisfaction of the relationship of $T_{MIN}/T_{AVE} \geq 0.20$.

The light transmittance T2" of the second peak Pb" at the peak wavelength P2" is preferably 15% or more and 35% or less, and more preferably 20% or more and 30% or less. With this, it is possible to suppress the average transmittance $T_{AVE}$ from becoming excessively large while increasing the minimum transmittance $T_{MIN}$. Therefore, it contributes to satisfaction of the relationship of $T_{MIN}/T_{AVE} \geq 0.20$.

The light transmittance T3" of the third peak Pc" at the peak wavelength P3" is preferably 45% or more and 65% or less, and more preferably 50% or more and 60% or less.

With this, it is possible to suppress the average transmittance $T_{AVE}$ from becoming excessively large. Therefore, it contributes to satisfaction of the relationship of $T_{MIN}/T_{AVE} \geq 0.20$.

By laminating the specific wavelength absorption layer 11 and the polarized layer 12 and synthesizing the light absorption spectrum, the optical sheet 1 having the above-described optical characteristics is obtained.

Subsequently, a method of manufacturing an optical sheet and a method of manufacturing an optical component will be described. Hereinafter, a case where an optical sheet is manufactured by using an extrusion method will be described as an example.

(Method of Manufacturing Optical Sheet)

First, an optical sheet manufacturing apparatus used in the present manufacturing method will be described.

Figure 3:
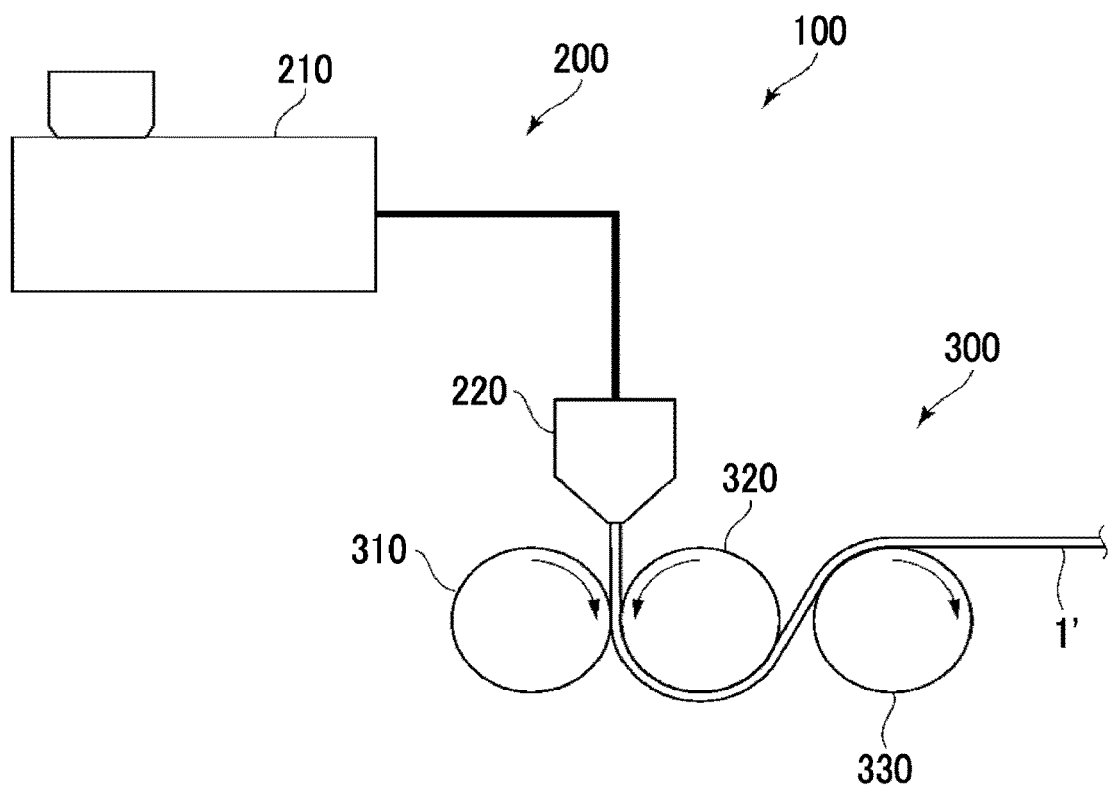
FIG. 3 is a side view schematically showing an optical sheet manufacturing apparatus for manufacturing the optical sheet shown in FIG. 1.
Figure 4:
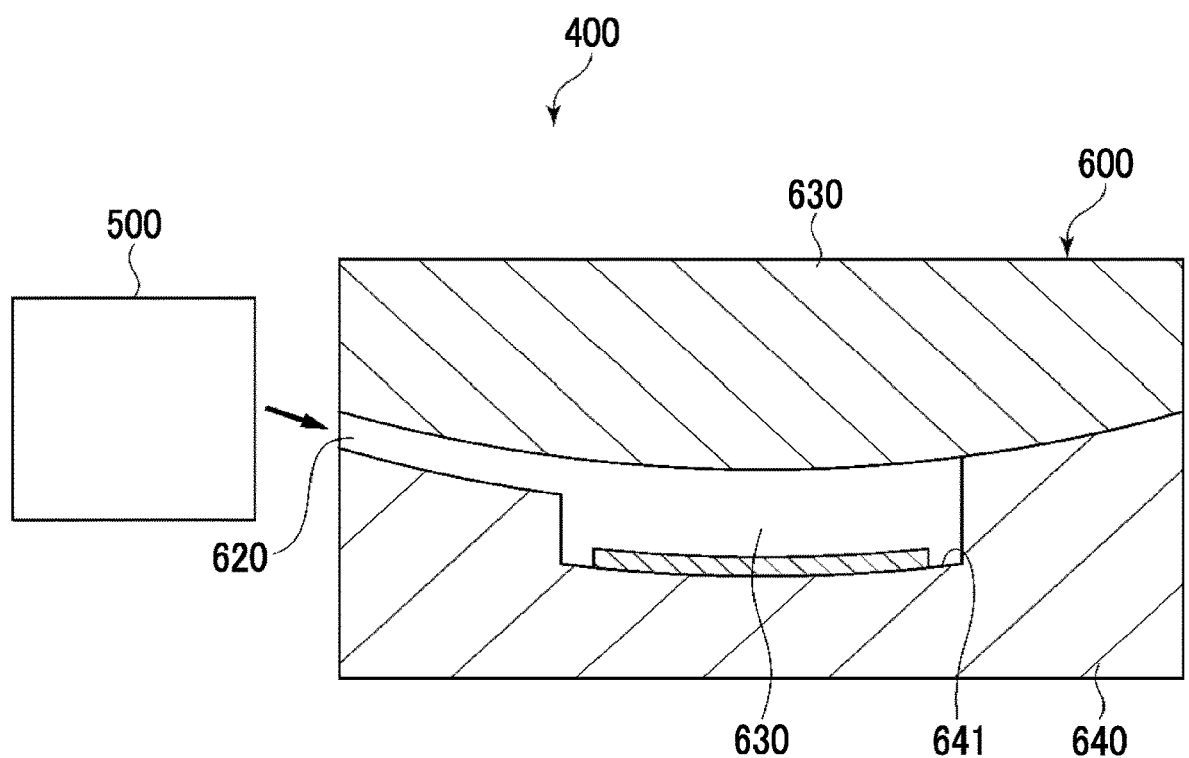
FIG. 4 is a sectional view schematically showing an optical component manufacturing apparatus for manufacturing the optical component shown in FIG. 1.

FIG. 3 is a side view schematically showing an optical sheet manufacturing apparatus for manufacturing the optical sheet shown in FIG. 1. FIG. 4 is a sectional view schematically showing an optical component manufacturing apparatus for manufacturing the optical sheet optical component shown in FIG. 1. In the following description, the upper side in FIG. 4 is referred to as "upper", and the lower side is referred to as "lower".

An optical sheet manufacturing apparatus 100 shown in FIG. 3 includes a sheet supply unit 200 and a sheet molding unit 300.

In the present embodiment, the sheet supply unit 200 includes an extruder 210 and a T-die 220 connected to a molten resin discharge unit of the extruder 210 via a pipe. A belt-shaped sheet 1' in a molten state or a softened state is supplied to the sheet molding unit 300 by the T-die 220.

The T-die 220 is an extrusion forming unit that extrudes the sheet 1' in a molten state or a softened state by an extrusion method in a state of a belt-shaped sheet. Constituent materials constituting the optical sheet 1 described above are loaded in the T-die 220 in a molten state, and by extruding the material in the molten state from the T-die 220, the belt-shaped sheet 1' is continuously fed.

The sheet molding unit 300 includes a touch roll 310, a cooling roll 320, and a post-stage cooling roll 330. Each of these rolls is configured to rotate independently by a motor (driving means) (not shown), and by the rotation of these rolls, cooling and continuous feeding are performed. By continuously feeding the sheet 1' into the sheet molding unit 300, a surface of the sheet 1' is flattened, and the sheet 1' is set to a desired thickness and cooled. The cooled sheet 1' is cut into a predetermined length to obtain an optical sheet 1.

The optical sheet of the present embodiment is produced by the optical sheet manufacturing method using the optical sheet manufacturing apparatus 100 as described above.

Manufacturing of the optical sheet includes an extrusion step, a molding step, and a cooling step.

First, a belt-shaped sheet 1' in a molten state or a softened state is extruded (an extrusion step). In this extrusion step, the constituent material of the optical sheet 1 (polycarbonate, light absorbing agent, ultraviolet absorbing agent, and the like) are loaded into the extruder 210. In addition, the constituent material of the optical sheet 1 is in a molten or softened state in the extruder 210.

Subsequently, the surface of the sheet 1' is flattened, and the sheet 1' is set to a predetermined thickness (molding step). The present step is performed between the touch roll 310 and the cooling roll 320.

Subsequently, the surface of the sheet 1' is cooled (cooling step). The present step is performed between the cooling roll 320 and the post-stage cooling roll 330.

It is possible to obtain the optical sheet 1 through the above steps. Subsequently, a method of manufacturing an optical component will be described.

(Method of Manufacturing Optical Component)

First, an optical component manufacturing apparatus used in the present manufacturing method will be described.

The optical component manufacturing apparatus 400 shown in FIG. 4 includes a resin supply unit 500 and a mold 600. The resin supply unit 500 is filled with the above-described polycarbonate. The mold 600 has a cavity 610 and a supply port 620 communicating the inside and the outside of the cavity 610. In addition, the mold 600 includes an upper member 630 and a lower member 640, and in a state where these components are assembled, the mold 600 that defines the optical component manufacturing apparatus 400 is configured.

The optical component of the present embodiment is manufactured by a method of manufacturing an optical component using the optical component manufacturing apparatus 400 as described above.

The method of manufacturing an optical component includes an optical sheet arranging step and a lens material supplying step.

First, in a state where the upper member 630 and the lower member 640 are disassembled, the optical sheet 1 is arranged on a bottom surface 641 of the lower member 640 (optical sheet arranging step). The bottom surface 641 is a curved concave surface, and with this, it is possible to form a curved surface on the lens 4. In addition, the optical sheet 1 has flexibility, and thus is arranged according to the shape of the bottom surface 641.

Subsequently, the upper member 630 and the lower member 640 are in an assembled state, and a lens material in a molten state or a softened state is poured through the supply port 620 (lens material supplying step). By cooling the lens material in a molten state or a softened state, it is possible to obtain a laminate in which the optical sheet 1 and the lens are laminated.

In the above description, a so-called sheet insert method has been described as an example. However, the present invention is not limited thereto. For example, the optical sheet 1 may be laminated on the molded lens via an adhesive.

Hereinabove, the preferable embodiments of the present invention have been described, but the present invention is not limited to the above-described configuration, and modifications, improvements, and the like within a scope in which the object of the present invention can be achieved are included in the present invention.

For example, each unit constituting the optical sheet of the present invention can be replaced with an optional constituent element exhibiting the same function.

In addition, the optical sheet of the present invention may be added with optional constituent components, in addition to the above-described configuration.

More specifically, for example, the optical sheet of the present invention may include a protective layer for protecting a surface, an intermediate layer, a power adjustment layer for adjusting the power as a lens, and the like.

EXAMPLES

Hereinafter, the present invention will be described more specifically based on examples.

1. Examination of Optical Sheet
1-1. Preparation of Optical Sheet

Example 1

[1] First, 100 parts by mass of bisphenol A-type polycarbonate ("Lupilon E2000FN E5100", manufactured by Mitsubishi Engineering Plastics), 0.003 parts by mass of light absorbing agent ("FDB-007", manufactured by Yamada Chemical Industry Co., Ltd.), 0.005 parts by mass of light absorbing agent ("FDR-002", manufactured by Yamada Chemical Co., Ltd.), 0.002 parts by mass of light absorbing agent ("FDG-006", manufactured by Yamada Chemical Co., Ltd.), and 0.350 parts by mass of ultraviolet absorbing agent ("ADEKA STAB LA-31G", manufactured by ADEKA CORPORATION) are stirred and mixed to prepare a specific wavelength absorption layer forming material. [2] Subsequently, the specific wavelength absorption layer forming material was accommodated in the extruder 210 of the optical sheet manufacturing apparatus 100 shown in FIG. 3, melted, and extrusion molding was performed by the T-die 220 to obtain a specific wavelength absorption layer. A thickness of the obtained specific wavelength absorption layer was 0.3 mm.

[2] In addition, 100 parts by mass of bisphenol A-type polycarbonate ("Lupilon E2000FN E5100", manufactured by Mitsubishi Engineering Plastics) was prepared as a protective layer forming material. The protective layer forming material was accommodated in the extruder 210 of the optical sheet manufacturing apparatus 100 shown in FIG. 3, melted, and extrusion molding was performed by the T-die 220 to obtain a protective layer. A thickness of the obtained protective layer was 0.325 mm.

[3] In addition, while stretching a polyvinyl alcohol film ("Kuraray Vinylon #7500" manufactured by Kuraray Co., Ltd.) in a water tank, the film is dyed with an aqueous solution in which the dye is dissolved, then immersed in a boric acid solution, and further washed with water and dried to obtain a polarized layer. In a case of dissolving the dye, the dye of the type shown in Table 1 was dissolved so as to obtain a blending amount as shown in Table 1 after drying. In addition, a thickness of the obtained polarized layer was 0.02 mm.

Examples 2, 3, 4, 5, 6, 7, 8, 9, 10

Except that the configuration of the optical sheet was modified as shown in Table 1, optical sheets of Examples 2, 3, 4, 5, 6, 7, 8, 9, 10 were obtained in the same manner as in Example 1.

Comparative Examples 1 and 2

Except that the configuration of the optical sheet was modified as shown in Table 1, optical sheets of Comparative Examples 1 and 2 were obtained in the same manner as in Example 1.

In addition, in Table 1, a1 represents polycarbonate ("Lupilon E2000FN", manufactured by Mitsubishi Engineering Plastics Co., Ltd.), a2 represents polycarbonate ("H3000", manufactured by Mitsubishi Engineering Plastics Co., Ltd.), and a3 represents polycarbonate ("200-3 NAT", manufactured by Sumika Polycarbonate Co., Ltd.).

In addition, in Table 1, b1 represents a light absorbing agent ("FDB-007", manufactured by Yamada Chemical Co., Ltd.), b2 represents a light absorbing agent ("FDG-006", manufactured by Yamada Chemical Co., Ltd.), and b3 represents a light absorbing agent ("FDR-002", manufactured by Yamada Chemical Co., Ltd.).

In addition, in Table 1, c represents an ultraviolet absorbing agent ("ADEKA STAB LA-31G", manufactured by ADEKA Corporation).

In addition, in Table 1, d1 represents a light absorbing agent as a first light absorbing agent ("EVERPULP YELLOW 6G LIQ", manufactured by Taiwan Eiko Co., Ltd.), d2 represents a light absorbing agent as a first light absorbing agent ("LA1120 Chrysophenine", manufactured by Taoka Chemical Co., Ltd.), d3 represents a light absorbing agent as a second light absorbing agent ("SUMILIGHT SUPRA ORANGE 2GL 125%", manufactured by Taoka Chemical Co., Ltd.), d4 represents a light absorbing agent as a second light absorbing agent ("T. A. Primula Red 4B", manufactured by Tokyo Aniline Dye Mfg. Co., Ltd.), and d5 represents a light absorbing agent as a third light absorbing agent ("SOLOPHENYL BLUE FGLE220%", manufactured by Huntsman Corporation).

1-2. Evaluation

Optical sheets of each example and each comparative example were evaluated by the following methods.

(Red/Green Emphasis Properties Evaluation)

A photograph of the red/green molded article was captured through the optical sheet manufactured as described above, and it was confirmed that the photograph has red/green emphasizing effects for 10 persons.

A: Has an effect for 10 persons out of 10 persons.
B: Has an effect for 6 to 9 persons out of 10 persons.
C: Has an effect for 2 to 5 persons out of 10 persons.
D: Has an effect for 1 person out of 10 persons.

(Color Discrimination Properties Evaluation)

A photograph of the molded article was captured through the optical sheet manufactured as described above, and it was confirmed that with the photograph, it is possible for 10 persons to correctly identify color of each molded article.

A: Identification was possible for 10 persons out of 10 persons.
B: Identification was possible for 6 to 9 persons out of 10 persons.
C: Identification was possible for 2 to 5 persons out of 10 persons.
D: Identification was possible for 1 person out of 10 persons.

The evaluation results of the optical sheets of each example and each comparative example obtained as above are shown in Table 1 below, respectively.

TABLE 1

| | | Example 1 | | | | Example 2 | | | | Example 3 | | | |
|---|---|---|---|---|---|---|---|---|---|---|---|---|---|
| Polarized layer | Type of light absorbing agent | d1 | d3 | d5 | | d1 | d4 | d5 | | d1 | d4 | d5 | |
| | Total content of light absorbing agent (wt %) | 0.05 | 0.01 | 0.03 | | 0.06 | 0.01 | 0.02 | | 0.02 | 0.02 | 0.02 | |
| | Thickness (mm) | | | | 0.02 | | | | 0.02 | | | | 0.02 |
| Specific wavelength absorption layer | Type of resin material | | | | a1 | | | | a1 | | | | a1 |
| | Type of light absorbing agent | b1 | b2 | b3 | c | b1 | b2 | b3 | c | b1 | b2 | b3 | c |
| | Total content of light absorbing agent (wt %) | 0.003 | 0.002 | 0.005 | 0.35 | 0.003 | 0.002 | 0.005 | 0.35 | 0.003 | 0.002 | 0.005 | 0.35 |
| | Thickness (mm) | | | | 0.3 | | | | 0.3 | | | | 0.3 |
| Light transmission spectrum | Peak wavelength P1 (nm) | | | | 495 | | | | 500 | | | | 500 |
| | Peak wavelength P2 (nm) | | | | 685 | | | | 685 | | | | 685 |
| | Transmittance T1 (%) | | | | 5.88 | | | | 5.85 | | | | 7.64 |
| | Transmittance T2 (%) | | | | 7.65 | | | | 9.49 | | | | 13.89 |
| | Half width W1 (nm) | | | | 9 | | | | 9 | | | | 9 |
| | Half width W2 (nm) | | | | 11 | | | | 11 | | | | 11 |
| | $T_{MIN}/T_{AVE}$ | | | | 0.41 | | | | 0.34 | | | | 0.37 |
| Evaluation | Red/green emphasis properties | | | | A | | | | A | | | | A |
| | Color discrimination properties evaluation | | | | A | | | | A | | | | A |

| | | Example 4 | | | | Example 5 | | | | Example 6 | | | |
|---|---|---|---|---|---|---|---|---|---|---|---|---|---|
| Polarized layer | Type of light absorbing agent | d1 | d4 | d5 | | d1 | d4 | d5 | | d1 | d4 | d5 | |
| | Total content of light absorbing agent (wt %) | 0.06 | 0.01 | 0.02 | | 0.06 | 0.01 | 0.02 | | 0.03 | 0.04 | 0.02 | |
| | Thickness (mm) | | | | 0.02 | | | | 0.02 | | | | 0.02 |
| Specific wavelength absorption layer | Type of resin material | | | | a2 | | | | a3 | | | | a1 |
| | Type of light absorbing agent | b1 | b2 | b3 | c | b1 | b2 | b3 | c | b1 | b2 | b3 | c |
| | Total content of light absorbing agent (wt %) | 0.003 | 0.002 | 0.005 | 0.35 | 0.003 | 0.002 | 0.005 | 0.35 | 0.003 | 0.002 | 0.005 | 0.35 |
| | Thickness (mm) | | | | 0.3 | | | | 0.3 | | | | 0.3 |
| Light transmission spectrum | Peak wavelength P1 (nm) | | | | 500 | | | | 500 | | | | 500 |
| | Peak wavelength P2 (nm) | | | | 685 | | | | 685 | | | | 685 |
| | Transmittance T1 (%) | | | | 5.86 | | | | 5.87 | | | | 6.37 |
| | Transmittance T2 (%) | | | | 9.42 | | | | 9.46 | | | | 14.41 |
| | Half width W1 (nm) | | | | 9 | | | | 9 | | | | 9 |
| | Half width W2 (nm) | | | | 11 | | | | 11 | | | | 11 |
| | $T_{MIN}/T_{AVE}$ | | | | 0.35 | | | | 0.34 | | | | 0.25 |
| Evaluation | Red/green emphasis properties | | | | A | | | | A | | | | B |
| | Color discrimination properties evaluation | | | | A | | | | A | | | | A |

TABLE 1-continued

| | | Example 7 | Example 8 | Example 9 |
|---|---|---|---|---|
| Polarized layer | Type of light absorbing agent | d2, d4, d5 | d1, d3, d4, d5 | d2, d4, d5 |
| | Total content of light absorbing agent (wt %) | 0.02, 0.03, 0.02 | 0.02, 0.03, 0.04, 0.02 | 0.02, 0.03, 0.01 |
| | Type of resin material | c | c | c |
| | Thickness (mm) | 0.35 | 0.35 | 0.35 |
| Specific wavelength absorption layer | Type of light absorbing agent | b1, b2, b3 | b1, b2, b3 | b1, b2, b3 |
| | Total content of light absorbing agent (wt %) | 0.003, 0.002, 0.005 | 0.003, 0.002, 0.005 | 0.003, 0.002, 0.005 |
| | Type of resin material | a1 | a1 | a1 |
| | (wt %) | 0.02 | 0.02 | 0.02 |
| | Thickness (mm) | 0.3 | 0.3 | 0.3 |
| Light transmission spectrum | Peak wavelength P1 (nm) | 500 | 495 | 495 |
| | Peak wavelength P2 (nm) | 685 | 685 | 685 |
| | Transmittance T1 (%) | 4.62 | 7.16 | 4.96 |
| | Transmittance T2 (%) | 14.80 | 14.82 | 16.55 |
| | Half width W1 (nm) | 9 | 9 | 9 |
| | Half width W2 (nm) | 11 | 11 | 11 |
| | $T_{MIN}/T_{AVE}$ | 0.24 | 0.30 | 0.22 |
| Evaluation | Red/green emphasis properties | B | A | B |
| | Color discrimination properties evaluation | A | A | B |

| | | Example 10 | Comparative Example 1 | Comparative Example 2 |
|---|---|---|---|---|
| Polarized layer | Type of light absorbing agent | d1, d3, d5 | d5 | d2, d3, d5 |
| | Total content of light absorbing agent (wt %) | 0.02, 0.01, 0.02 | 0.01 | 0.03, 0.04, 0.02 |
| | Type of resin material | c | c | c |
| | Thickness (mm) | 0.35 | 0.35 | 0.35 |
| Specific wavelength absorption layer | Type of light absorbing agent | b1, b2, b3 | b3 | b1, b2, b3 |
| | Total content of light absorbing agent (wt %) | 0.003, 0.002, 0.005 | 0.005 | 0.003, 0.002, 0.005 |
| | Type of resin material | a1 | a1 | a1 |
| | (wt %) | 0.02 | 0.02 | 0.02 |
| | Thickness (mm) | 0.3 | 0.3 | 0.3 |
| Light transmission spectrum | Peak wavelength P1 (nm) | 495 | 495 | 495 |
| | Peak wavelength P2 (nm) | 685 | 685 | 665 |
| | Transmittance T1 (%) | 4.27 | 3.87 | 4.10 |
| | Transmittance T2 (%) | 14.25 | 17.78 | 14.68 |
| | Half width W1 (nm) | 9 | 9 | 9 |
| | Half width W2 (nm) | 11 | 11 | 11 |
| | $T_{MIN}/T_{AVE}$ | 0.21 | 0.17 | 0.18 |
| Evaluation | Red/green emphasis properties | B | D | D |
| | Color discrimination properties evaluation | B | D | C |

As shown in Table 1, in the optical sheet in each example, the green color could be emphasized more than in each comparative example, and a satisfactory result was obtained for each comparative example.

INDUSTRIAL APPLICABILITY

According to the present invention, it is possible to provide an optical sheet and an optical component emphasizing light of a specific wavelength range with respect to a user and enabling the user to perform color discrimination. Therefore, the present invention has industrial applicability.

The invention claimed is:

1. An optical sheet, comprising:
a polarized layer having a polarization function and comprising a first light absorbing agent having a light absorptance peak in a wavelength range of 380 nm to 430 nm, a second light absorbing agent having a light absorptance peak in a wavelength range of 430 nm to 580 nm, and a third light absorbing agent having a light absorptance peak in a wavelength range of 580 nm to 680 nm; and
a light absorbing layer comprising a resin and at least one light absorbing agent such that the light absorbing layer absorbs light of a specific wavelength range in a visible light range,
wherein the polarized layer and the light absorbing layer are laminated, the optical sheet has a first peak having an absorptance peak wavelength P1 in a wavelength range of 460 nm to 510 nm and a second peak having an absorptance peak wavelength P2 in a wavelength range of 650 nm to 700 nm in a light absorption spectrum, $T_{MIN}/T_{AVE}$ is 0.20 or more, where the $T_{AVE}$ is an average transmittance of visible light in a wavelength range of 475 nm to 650 nm and the $T_{MIN}$ is a minimum transmittance of visible light in the wavelength range of 475 nm to 650 nm, a half width W1 of the first peak is in a range of 5 nm to 15 nm, a half width W2 of the second peak is in a range of 5 nm to 15 nm, a light transmittance T1 at the absorptance peak wavelength P1 is in a range of 2% to 17%, and a light transmittance T2 at the absorptance peak wavelength P2 is in a range of 5% to 20%.

2. The optical sheet according to claim 1, wherein the $T_{MIN}$ is in a range of 2% to 17%.

3. The optical sheet according to claim 1, wherein the $T_{AVE}$ is in a range of 10% to 25%.

4. The optical sheet according to claim 1, wherein the first light absorbing agent, the second light absorbing agent, and the third light absorbing agent are azo-based dyes.

5. An optical component, comprising:
a substrate; and
the optical sheet of claim 1 laminated on the substrate.

6. The optical sheet according to claim 2, wherein the $T_{AVE}$ is in a range of 10% to 25%.

7. The optical sheet according to claim 2, wherein the first light absorbing agent, the second light absorbing agent, and the third light absorbing agent are azo-based dyes.

8. An optical component, comprising:
a substrate; and
the optical sheet of claim 2 laminated on the substrate.

9. The optical sheet according to claim 3, wherein the first light absorbing agent, the second light absorbing aunt, and the third light absorbing agent are azo-based dyes.

10. An optical component, comprising:
a substrate; and
the optical sheet of claim 3 laminated on the substrate.

11. An optical component, comprising:
a substrate; and
the optical sheet of claim 4 laminated on the substrate.

12. The optical sheet according to claim 1, wherein the light transmittance T1 at the absorptance peak wavelength P1 is in a range of 4% to 15%.

13. The optical sheet according to claim 1, wherein the light transmittance T2 at the absorptance peak wavelength P2 is in a range of 6% to 17%.

14. The optical sheet according to claim 1, wherein the light transmittance T2 at the absorptance peak wavelength P2 is in a range of 7.5% to 15%.

15. The optical sheet according to claim 1, wherein the $T_{MIN}$ is in a range of 4% to 15%.

16. The optical sheet according to claim 1, wherein the $T_{AVE}$ is in a range of 10% to 17%.

17. The optical sheet according to claim 1, wherein $T_{MIN}/T_{AVE}$ is 0.23 or more.

18. The optical sheet according to claim 1, wherein $T_{MIN}/T_{AVE}$ is 0.29 or more.

19. The optical sheet according to claim 1, wherein $T_{MIN}/T_{AVE}$ is 0.7 or less.

20. The optical sheet according to claim 17, wherein $T_{MIN}/T_{AVE}$ is 0.7 or less.

* * * * *